United States Patent [19]

Hamawaki et al.

[11] Patent Number: 5,178,221
[45] Date of Patent: Jan. 12, 1993

[54] CORE-GATHERING APPARATUS AND A MAIN CONVEYOR BELT DRIVE ROLLER STRUCTURE FOR THE APPARATUS

[75] Inventors: Yoshinobu Hamawaki, Okayama; Hirofumi Kawahara, Sakaide, both of Japan

[73] Assignees: Seirei Kogyo Inc., Okayama; Kawahara Yanmar Inc., Kagawa, both of Japan

[21] Appl. No.: 684,035

[22] Filed: Apr. 11, 1991

[30] Foreign Application Priority Data

Sep. 20, 1990 [JP] Japan .................. 2-253585

[51] Int. Cl.⁵ .......................................... A01B 45/02
[52] U.S. Cl. .......................................... 172/22; 172/33; 414/502; 414/528; 198/626.2; 474/188
[58] Field of Search ................ 172/22, 33; 171/142; 198/626.2, 842; 474/164, 184, 189, 175, 176, 177, 178, 166, 188; 414/502, 528

[56] References Cited

U.S. PATENT DOCUMENTS

| | | | |
|---|---|---|---|
| 2,257,351 | 9/1941 | Silver | 198/626.2 X |
| 3,429,378 | 2/1969 | Mascaro | |
| 3,653,445 | 4/1972 | Barnes | 171/58 |
| 3,772,931 | 11/1973 | Conrad et al. | 474/189 |
| 4,148,362 | 4/1979 | Orth | 172/22 |
| 4,585,384 | 4/1986 | Richard et al. | 198/626.2 X |
| 4,592,463 | 6/1986 | Puskar | 198/842 |
| 4,878,802 | 11/1989 | Hansen et al. | 414/528 X |
| 4,913,279 | 4/1990 | Tonissen | 198/842 X |
| 4,936,441 | 6/1990 | Akesaka | 198/626.2 |
| 5,002,453 | 3/1991 | Shigehisa | 172/22 X |
| 5,050,727 | 9/1991 | Akesaka | 198/842 X |
| 5,069,293 | 12/1991 | St. Romain | 172/22 |

Primary Examiner—Randolph A. Reese
Assistant Examiner—Jeffrey L. Thompson
Attorney, Agent, or Firm—Koda and Antrolia

[57] ABSTRACT

An apparatus which gathers earthen cores dug out by a boring machine operates with a main conveyor belt and auxiliary conveyor belt which are partially forced in contact with each other so as to sandwich earthen cores inbetween and transfer the cords to a collecting box. The main conveyor belt is driven by a single drive roller that has axially inclined projecting strips on the end portions so as to prevent the main conveyor belt from shifting in position.

4 Claims, 5 Drawing Sheets

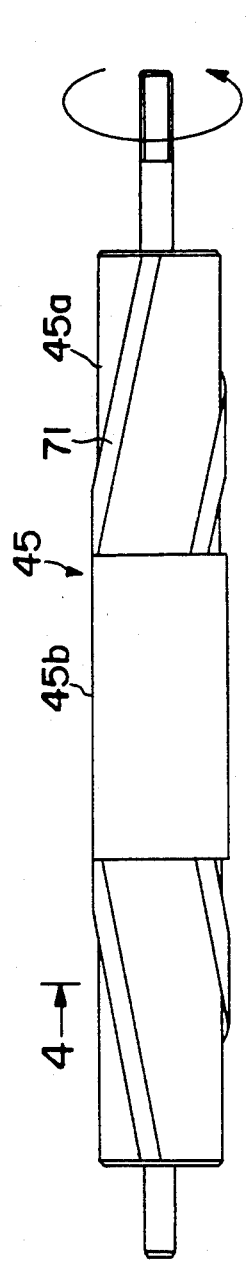
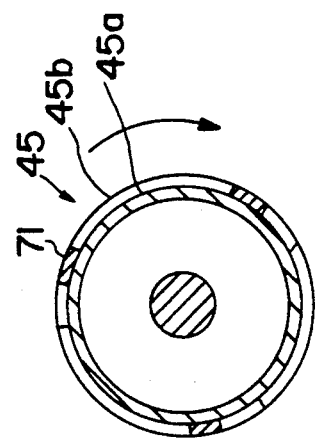
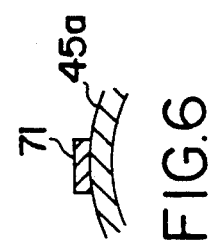
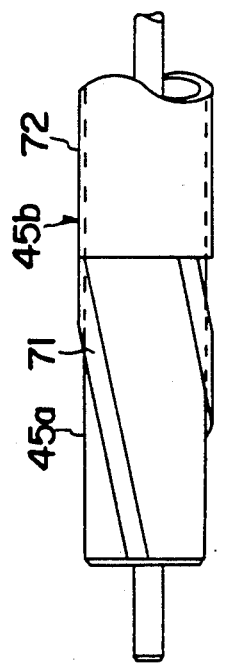

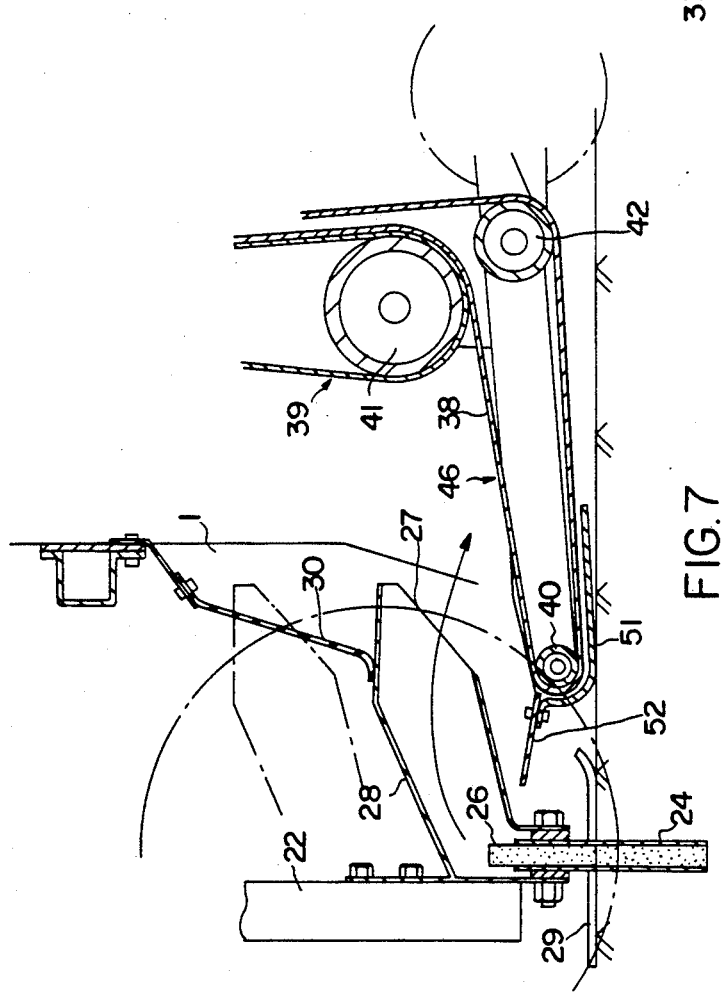

CORE-GATHERING APPARATUS AND A MAIN CONVEYOR BELT DRIVE ROLLER STRUCTURE FOR THE APPARATUS

BACKGROUND OF THE INVENTION

1. Field of the Invention

The present invention relates to an apparatus for gathering earthen cores extracted from vertical holes and a roller which drives the main conveyor belt of the core-gathering apparatus.

2. Prior Art

Japanese Patent Application Kokai (Laid-Open) No. 63-248305 discloses an example of a core-gathering machine. This machine digs the ground with cylindrical tines and extracts earthen cores (called "cores" hereinafter). Then, it conveys and collects the cores while holding the cores between a main conveyor belt which in a reversed Z ("S") shape (when viewed from one side) and an auxiliary conveyor belt which is in an I-shape (when viewed from the side).

However, the conventional machine is not completely satisfactory from the standpoint of receiving and conveying cores from the core-gathering apparatus. In particular, though the main conveyor belt in the core-gathering machine is driven by a main conveyor belt drive roller (called "drive roller"), during the operation the position of the main conveyor belt shifts in the axial direction of the drive roller as a result of differences in the load resistance, etc. This results in mis-positioning of the belt. When the main conveyor belt is thus mis-positioned, a desirable conveying of the cores is naturally hindered.

Moreover, the main conveyor belt rubs against the side plates, etc. which are installed on both sides of the belt. This results in that the belt and side plates are easily damaged.

The above problem is derived from the following functional characteristics of the main conveyor belt: i.e., the main conveyor belt is a sheet-form belt, having a considerable width. In addition, the distribution of cores carried by this belt is not uniform in the direction of width.

In particular, if the distribution of the cores is biased in the direction of width, the load resistance can vary. As a result, the main conveyor belt tends to lag on the side where the load resistance is larger. Thus, the belt is shifted in this direction. Even if the tension of the main conveyor belt is increased overall or adjusted in the direction of the width in an attempt to prevent the shifting thereof, the effect is not satisfactory. In short, if the main conveyor belt shifts in its position, a means forcibly returning the belt to its original position is required. This might conceivably be accomplished by forming the center of the drive roller higher than the edges thereof. In this case, however, how high the center should be is another problem. If the center of the belt is too low, the inhibiting force which prevents positional shifting of the belt will be small. On the other hand, if the center of the belt is too large, the main conveyor belt may not come into contact with the drive roller at the ends of the roller since the main conveyor belt has a large width. In such cases, a sufficient driving force cannot be obtained.

SUMMARY OF THE INVENTION

The primary object of the present invention is to solve the above-described problems.

It is main object of the present invention to provide a core-gathering apparatus which securely receives and conveys the earthen cores.

It is another object of the present invention to provide a main conveyor belt drive roller structure used therein which effectively restores the main conveyor belt to its original position even if the belt should shift to an improper position, obtaining a strong driving force for the entire width of the belt.

The above and other objects of the present invention is accomplished by a unique structure wherein:

The core-gathering apparatus, which is linked to a vertical hole boring machine that collects and discharges the cores, is constructed so that a main conveyor belt which is driven by an engine is installed so as to form a Z shape consisting of a horizontal receiving part, an upward conveying part and a horizontal conveying and discharging part. A transfer plate is positioned beneath the discharge port of the boring machine and used as a part of the main conveyor belt. The earthen cores discharged from the discharge port of the boring machine are first received and conveyed by the horizontal receiving part of the main conveyer belt. The cores are then sandwiched between the upward conveying part of the main conveyer belt and an auxiliary conveyor belt (which is mounted in an I shape configuration) and carried upward. The earthen cores thus conveyed upward are moved onto the horizontal conveying and discharge part of the main conveyer belt and discharged thereby. The earthen cores thus discharged are collected in a box which is installed beneath the horizontal conveying and discharging part.

A main conveyor belt drive roller used in the above core-gathering apparatus is characterized in that both end sections thereof are formed smaller in diameter than the central section, and projecting strips having the outermost surfaces being approximately the same diameter as the central section and inclined axially rearward relative to the direction of rotation are formed at fixed intervals on the outer surfaces of the end sections.

With the structure described above, the cores discharged from the vertical hole boring machine are received, conveyed, and collected by the core-gathering apparatus.

Also, when the drive roller for the main conveyer of the core-gathering apparatus is rotated, the tip end portions of the projecting strips stay front of the near-the-center portion of the projecting strips. Accordingly, the main conveyor belt is kept at its original position, thus being prevented from shifting to an improper position. Also, since these projecting strips are approximately as high as the central section, a strong driving force can be obtained for the entire width of the main conveyor belt.

BRIEF DESCRIPTION OF THE DRAWINGS

FIG. 3 is a side view of the drive roller used in the core-gathering apparatus;

FIG. 4 is an enlarged cross section of the drive roller takend along line 4—4 of FIG. 3;

FIG. 5 is a partial side view showing another type of drive roller;

FIG. 6 is an enlarged cross section of one of the projecting strips formed on the drive roller;

FIG. 7 is a partially cross-sectional side view of the tines used in the boring machine;

FIG. 8 is a partial rear view thereof;

DETAILED DESCRIPTION OF THE INVENTION

One embodiment of the present invention will be described below with reference to the attached drawings.

Figure 1:
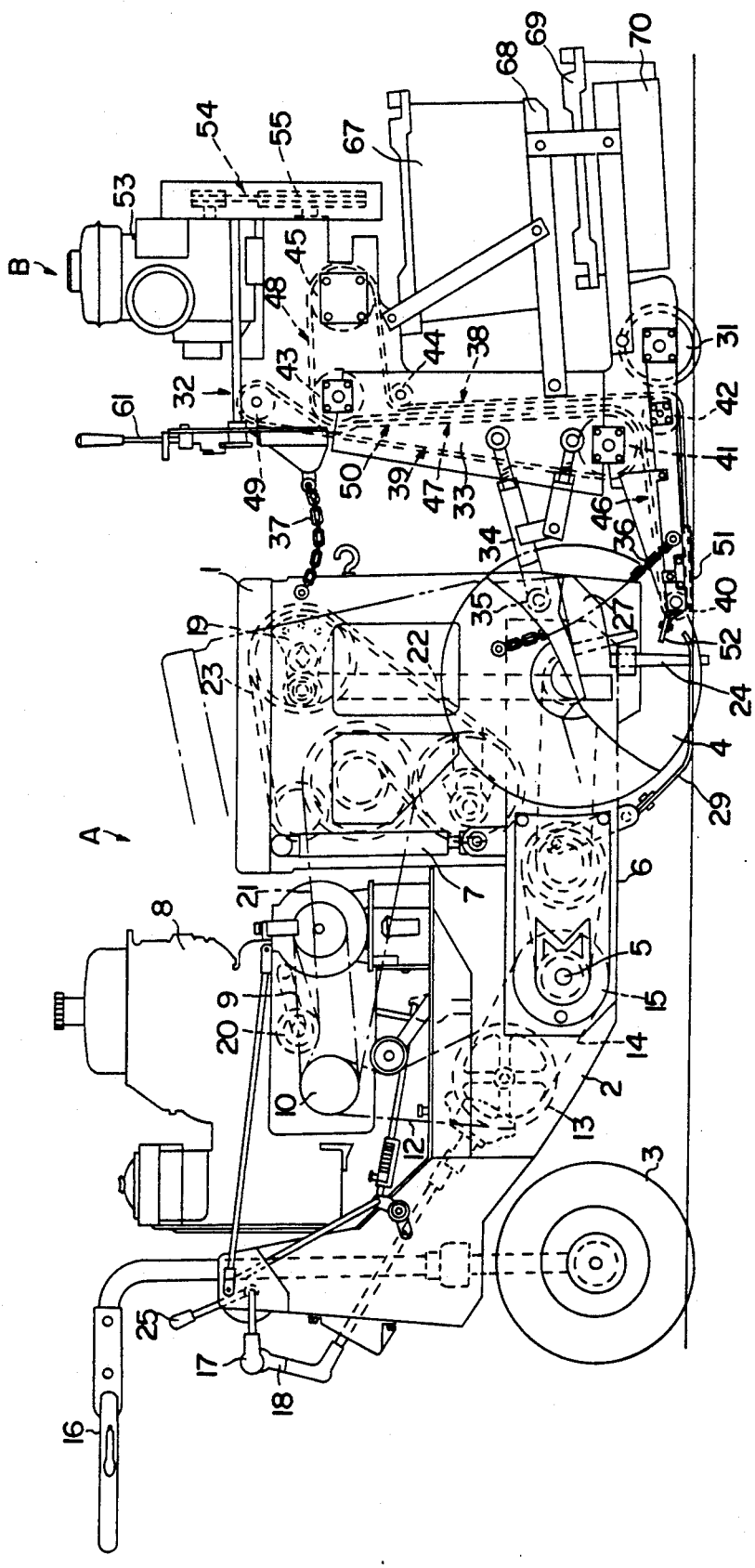
FIG. 1 is an elevational side view of the core-gathering apparatus of the present invention linked to a vertical hole boring machine.
Figure 2:
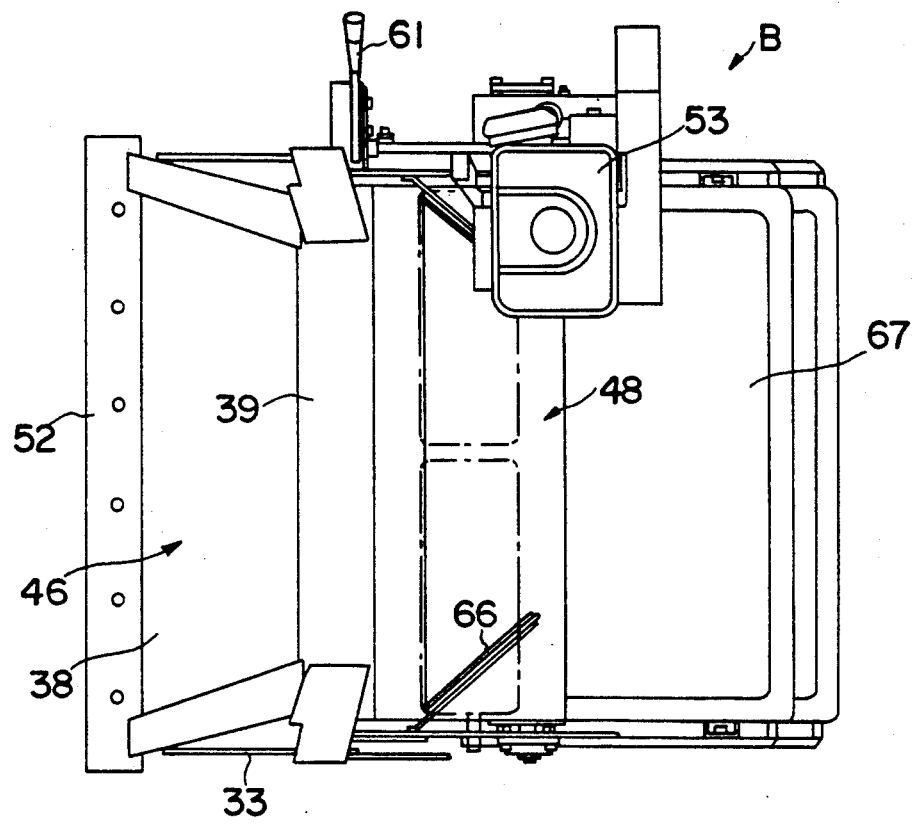
FIG. 2 is a plan view of the core-gathering apparatus.

FIG. 1 shows the side view of the vertical hole boring machine A and core-gathering apparatus B which are linked together. FIG. 2 is a top view of the core-gathering apparatus B.

In the vertical hole boring machine A, a main body 2 has a cabinet 1 installed on its rear half and is supported by a front wheel 3 located at the center of the main body and two rear wheels 4 located on the left and right. The rear wheels 4 are mounted to a rear wheel frame 6 which is free to rotate about a support shaft 5 that projects to the left and right of the main body 2. Thus, the rear wheels 4 are independent from the main body 2.

A hydraulic cylinder 7 is installed vertically between the rear wheel frame 6 and the main body 2. When the shaft of this hydraulic cylinder 7 is extended and retracted, the main body 2 (cabinet 1) moves vertically with respect to the rear wheels 4.

An engine 8 is mounted on the main body 2 in front of the cabinet 1. The motive force of this engine 8 is transmitted to a drive pulley 10 via a pulley-and-belt mechanism 9 and then transmitted to a running drive pulley 13 via a pulley-and-belt mechanism 12 with a clutch mechanism 11 interposed so that the motive force can be freely transmitted and cut off.

The motive force of the running drive pulley 14 is transmitted to the rear wheels 4 via a sprocket-and-chain mechanism 14. The sprocket 15 which is a part of this sprocket-and-chain mechanism 14 is mounted on the supporting shaft 5, so that the transmission of the motive force to the rear wheels 4 is not hindered even if the rear wheel frame 6 should rotate about the supporting shaft 5.

A steering handle 16 is installed on the front part of the main body 2. A clutch lever 17 which operates the clutch mechanism 11 and a speed-change lever 18 which controls the rpm of the running drive pulley 13 are also installed here. Thus, when the clutch lever 17 is operated, the boring machine A begins to run. The running speed can be altered by operating the speed-change lever 18.

A crank wheel 19 is installed inside the cabinet 1. The motive force of the drive pulley 10 is transmitted to this crank wheel 19 via a pulley-and-belt mechanism 21 with a clutch mechanism 20 interposed so that the motive force is transmitted and then cut off as desired.

Tine rods 22 are connected to the crank wheel 19 by pins 23, and hollow cylindrical tines 24 are mounted to the lower ends of the tine rods 22. Accordingly, when the crank wheel 19 rotates, the tine rods 22 and tines 24 move up and down. This up and down motion of the tine rods 22 is controlled by operating a tine lever 25 which is installed on the steering handle 16, and which engages and disengages the clutch mechanism 20.

The positional relationship of the tines 24 is set so that they are separated from the ground surface when they go up to the highest point, and so that the tines 24 are inserted into the ground almost completely when they are lowered to their lowest point. When the tines 24 are pushed into the ground, they dig out the cores 26 for the length that corresponds to inserted depth. By repeating this action, cores are successively raised in the tines 24 so that preceding cores are pushed out from the upper ends of the tines 24 by the following cores.

FIG. 7 shows the detail of the tines 24 (only one shown). FIG. 8 is a rear view thereof.

A guide chute 28 which extends upward and rearward to the discharge port 27 is installed near the lower end of each tine rod 22. The tines 24 are installed so that the upper ends protrude into the lower end of the corresponding guide chute 28.

One guide chute is attached to each tine rod 22. A plurality of tines, for example 2 to 4, are mounted in each guide chute 28, and a multiple number of sets each comprising the tine rods and tines are used. These sets are arranged so that the phase of vertical motion is different from each other.

When the cores 26 extracted by the tines 24 are pushed out from the upper ends of the tines 24, the cores 26 pass through the corresponding guide chute 28 and are discharged from the corresponding discharge port 27.

A fork-form pressing plate 29 is extended from the bottom of the main body 2 so that the pressing plate 29 runs along the ground alongside the tines 24. The pressing plate 29 presses the earth surrounding the tines 24 so that the earth does not pile up when the tines 24 are inserted into the ground.

In order to prevent the cores 26 that have been discharged from the discharge port 27 of each guide chute 28 from flying forward in the direction of the tine rod 22, a rubber cover 30 is fastened to the rear wall of the cabinet 1, etc. The lower end of the rubber cover 30 extends to each guide chute 28.

The core-gathering apparatus B is linked to the rear end of the thus constructed vertical hole boring machine A so that the core-gathering apparatus receives and collects the cores 26 discharged from the guide chutes 28 of the boring machine A.

In the core-gathering apparatus B, a main frame 32 has an upright structure and is supported by a running roller 31 which acts also as a pressing roller. Connecting rods 34 are pivotally connected to pins 35 which are installed on the side walls of the cabinet 1 of the boring machine A. The connecting rods 34 extend forward from the side plates 33 of the main frame 32. Chains 36 and 37 are fastened to the lower and upper portions of each side plate 33, and the boring machine A and the core-gathering apparatus B are linked via the chains 36 and 37.

A main conveyor belt 38 and an auxiliary conveyor belt 39 are installed on the main frame 32 of the core-gathering apparatus B. The main conveyor belt 38 is installed around six rollers 40 through 45 and has a reversed Z ($\mathsf{S}$) configuration when viewed from the side as shown in the drawings (regular Z configuration when viewed from the other side). The lower horizontal part of this configuration is called in the specification a "horizontal receiving part 46", the middle vertical part is an "upward conveying part 47", and the upper horizontal part is a "horizontal conveying and discharging part "48".

The auxiliary conveyor belt 39 is installed between the roller 41 (which is beneath the roller 44) and roller 49 (which is above the roller 44). The auxiliary conveyor belt 39 is formed in an I shape in front of the upward conveying part of the main conveyor belt 38. The vertical part of the auxiliary conveyor belt 39, called an "upward conveying part 50," is installed so that the upward conveying part 50 is pressed against the upward conveying part 47 of the main conveyor belt 38 and stays in contact therewith.

A ground-contact 51 is fastened to both side plates 33 and extends rearward with its leading end in contact with the ground so that the contact 51 is around the circumference of the lower half of the roller 40 (which is at the leading end of the main conveyor belt 38).

A transfer plate 52 which is inclined downward toward the rear end is attached to the front of this ground-contact 51.

The main frame 32 of the core-gathering apparatus B is thus supported on the ground by the running roller 31 and the ground-contact 51. The transfer plate 52 is positioned farther forward than the discharge ports 27 of the guide chutes 28 when the core-gathering apparatus B is linked to the boring machine A. Thus, the cores 26 discharged from the discharge ports 27 are securely carried to the horizontal receiving part 46 of the main conveyor belt 38 by the transfer plate 52.

The main conveyor belt 38 is driven by an engine 53 (which is installed on the main frame 32) in the direction that the front side of the upward conveying part 47, which is in contact with the auxiliary conveyer belt, runs upward. More specifically, among the rollers 40 through 45, only the roller 45 is connected to the engine 53 so that the motive force of the engine 53 is transmitted to this roller 45 via a clutch mechanism 54 and power transmission mechanism 55. Thus, the roller 45 is a main conveyor belt driver roller (hereafter called "drive roller").

Figure 9:
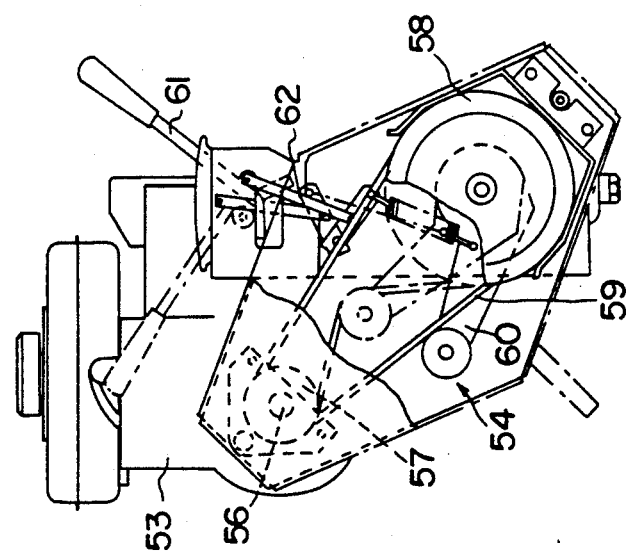
FIG. 9 is a rear view of the clutch mechanism used in the core-gathering apparatus.

FIG. 9 shows the clutch mechanism 54. A belt 59 is installed between an output pulley 57 (which is attached to the output shaft 56 of the engine 54) and a drive pulley 58 (which is installed alongside the drive roller 45). The motive force is transmitted and interrupted by tensing and relaxing the belt 59 via a clutch arm 60 that pivots about the drive pulley 58. The pivotal motion of the clutch arm 60 is accomplished by transmitting the rotation of a clutch lever 61 (installed in a separate place) via an operating transmission mechanism 62 that consists of link, rod, spring, etc.

Figure 10:
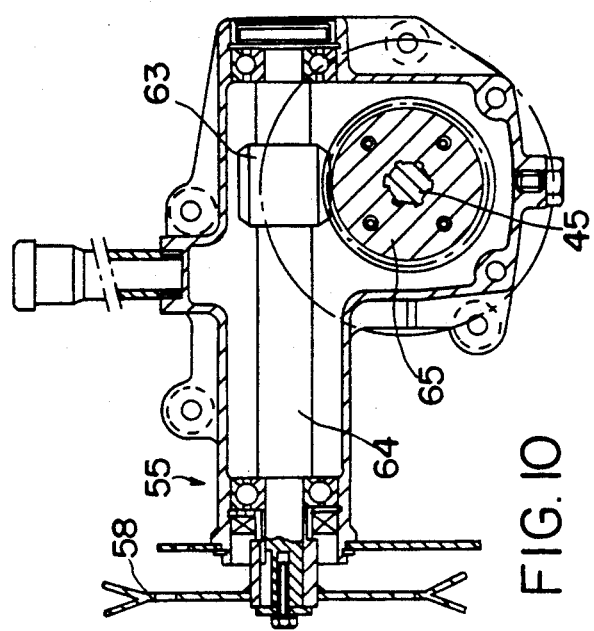
FIG. 10 is a partially cross-sectional side view of the driving system of the drive roller.
Figure 11:
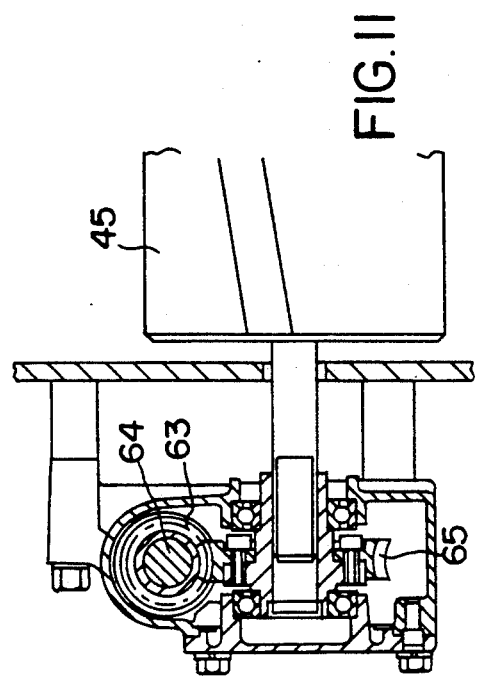
FIG. 11 is a partially cross-sectional front view thereof.

FIG. 10 shows the power transmission mechanism 55, and FIG. 11 shows one end thereof.

The drive pulley 58 is attached to a worm shaft 64 on which a worm 63 is formed, and this worm 63 is engaged with a worm wheel 65 which is fit over one end of the shaft of the drive roller 45. The motive force of the engine 53 transmitted to the drive pulley 58 via the clutch lever 61 is further transmitted from the worm 63 to the worm wheel 65. The main conveyor belt 38 is thus driven.

In operation, the cores 26 extracted by the vertical hole boring machine A are discharged from the discharge ports 27 of the guide chutes 28. The discharged cores 26 are received by the horizontal receiving part 46 of the main conveyor belt 38.

The cores are then conveyed to the upward conveying part 47. Since the upward conveying part 50 of the auxiliary conveyor belt 39 is in contact with the upward conveying part 47 of the main conveyor belt 38, the frictional force arising from the driving of the main conveyor belt 38 is transmitted to the auxiliary conveyor belt 39. Thus, the two belts 38 and 39 sandwich the cores 26 between them and convey the cores 26 upward.

When the cores reach the point where the auxiliary conveyor belt 39 is separated from the main conveyor belt 38, the cores 26 enter the horizontal conveying and discharging part 48 of the main conveyer belt 38 and are discharged downward from the trailing end of the conveying and discharging part 48.

Guide 66 (see FIG. 2) is installed on the left and right sides of the upper surface of the horizontal conveying and discharging part 48 of the main conveyer belt 38. The guide 66 move the cores 26 at the edges of the belt to the center thereof.

A collecting box 67 is set on a frame 68 attached to the main frame 32. The box 67 is positioned beneath the trailing end of the horizontal conveying and discharging part 48 so that the discharged cores 26 drop into the box 67 and are collected in there. Beneath the collecting box 67 is a spare collecting box 69 installed on a frame 70.

During the operation, if the shaft of the hydraulic cylinder 7 of the boring machine A is extended and the cabinet 1 is raised, the tines 24 will no longer act on the ground. In this way, the boring job can be interrupted by thus operating the cylinder 7. Such an operation of the cylinder 7 further causes the core-gathering apparatus B to be pulled towards the boring machine A via the connecting rods 34 and chains 36 and 37. As a result, the ground-contact 50 is moved to the height that lifts the contact 50 and separate it from the ground surface.

FIG. 3 shows the detail of the drive roller 45, and FIG. 4 shows an enlarged cross section thereof.

Two end sections 45a of the drive roller 45 are smaller in diameter than the central section 45b. Projecting strips 71 are formed at fixed intervals on the outer surfaces of the end sections 45a. The outermost surfaces of the projection strips draw a (imaginary) circle that is of approximately the same diameter as the central section 45b. The projecting strips 71 are inclined rearward in relation to the axis of the drive roller 45 in the rotational direction thereof. In other words, portions of the projections closer to the central section 45b stay behind the portions closer to both ends 45b when the roller 45 is rotated (or, the tip end portions of the projecting strips stay in front of the near-the-center portion of the projecting strips when the roller is rotated).

It is desirable that the diameter of the end sections 45a be approximately 2 to 3 mm smaller than the central section 45b. It is also desirable that the two end sections 45a and the central part 45b form three roughly equal divisions in the axial direction. It is further desirable that the width of the projecting strips 71 be 0.15 to 0.3 times the diameter of the end sections 45a. In addition, it is desirable that the angle of inclination of the projection strips 71 be 10 to 15 degrees. It is also desirable that the spaces between the adjacent projecting strips 71 be greater than the width of each projecting strip 71. The number of projection strips 71 is determined from these relationships and from the diameter of the drive roller 45. Generally, however, 3 to 5 projecting strips 71 are most appropriate to be formed on the drive roller.

FIG. 5 shows another type of drive roller 45. The drive roller 45 is made of a pipe of even diameter. A sleeve 72 is fit over the central section 45b of the pipe and is fastened in place by welding, etc. so that the diameter of the central section 45b is larger than the rest of the drive roller 45. This type of drive roller does not require cutting to form smaller-diameter end sections 45a. Thus, it is advantageous in view of manufacturing costs.

FIG. 6 shows an enlarged cross section of one of the projecting strips 71. The strips 71 may be fastened to the end sections 45a of the drive roller 45 by welding, etc. It is preferable not to leave the welding material on the forward surfaces of each strip with respect to the rotational direction and not to form the corners of the strips round.

When the drive roller 45 of the (two) types as described above is used, the main conveyor belt 38 is driven with a sufficient driving force without any causing positional shifting.

The table below shows the results obtained when the core-gathering work was performed in a golf course by the use of improved drive roller 45 of the present invention. Though the core-gathering work with conventional drive rollers became unsatisfactory before the completion of one out of eighteen holes of a golf course, a great difference in effectiveness was observed when the drive roller 45 of the present invention was used.

TABLE

| Golf Course | Number of Holes Worked | Results |
| --- | --- | --- |
| A | 18 | Working still possible after completion |
| B | 18 | Working still possible after completion |
| C | 24 | Working still possible after completion |

The present invention as described above has the following advantages:

(i) The core-gathering apparatus uses a main conveyor belt which has a "$\leq$" shaped configuration (when viewed from the side) and an auxiliary conveyor belt which has an "I"-shaped configuration (when viewed from the side) that work together so that cores discharged from the boring machine are completely received, conveyed and collected. In addition, the presence of the transfer plate at the tip end of the horizontal receiving part of the main conveyor belt contributes to a completely reliable core receiving action. Since the driving source which drives the main conveyor belt is mounted on the core-gathering apparatus independent from the boring machine. There is no need to install a complicated power transmission mechanism, etc., to transmit power from the boring machine to the core-gathering apparatus.

(ii) Since the end sections of the drive roller used in the main conveyor belt of the core-gathering apparatus are smaller in diameter than the central section of the roller, the belt is driven by a roller which is virtually in a form of high-center. This is very effective in preventing positional shifting of the belt.

(iii) Since the projecting strips which are more or less the same diameter as the central section of the drive roller are installed on the both ends of the drive roller, a driving force is generated for the entire width of the drive roller. Thus, reduction in the driving force does not occur.

(iv) The projecting strips are inclined relative to the axis of the roller so that one end portion which is near the center of the roller stay behind the other end portions which is farthest from the center of the roller when the roller is rotated. Accordingly, even if the main conveyor belt should begin to shift its position, a restoring force is generated by the angle of the inclination of the projecting strips so that the belt is returned to its original position.

(v) Since the projection strips are provided with spaces inbetween, the main conveyor belt contacts the surfaces of the projecting strips and such spaces so as to be driven by the both projecting strips and the spaces. Accordingly, a large driving force is given to the main conveyor belt without any slippage.

We claim:

1. A core-gathering apparatus linked to a vertical hole boring machine so as to gather earthen cores which are extracted and discharged by said vertical hole boring machine, said core-gathering apparatus being characterized in that a main flat conveyor belt which is driven by an engine separately mounted from said boring machine is installed in a configuration consisting of a horizontal receiving part, an upward conveying part and a horizontal conveying and discharging part, forming as a whole a reversed Z-shape when viewed from the side, with said conveyor belt being provided as a continuation of a transfer plate inclined upward toward the forward end and provided beneath a discharge port of said boring machine so that a tip end of said transfer plate is located farther forward than said discharge port, said earthen cores extracted by tines which are provided on said vertical hole boring machine, said extracted earthen cores are guided by guide chutes and discharged from said discharge port of said boring machine and are received and conveyed by said horizontal receiving part, the earthen cores conveyed from said horizontal receiving part are sandwiched between said upward conveying part and an auxiliary flat conveyor belt, which is mounted in an I shaped configuration when viewed from the side and in contact with a front surface of said upward conveying part, and conveyed upward, the earthen cores conveyed upward by said upward conveying part are conveyed and discharged by said horizontal conveying and discharging part, and the earthen cores discharged from said horizontal conveying and discharging part are collected in a collecting box which is installed beneath said horizontal conveying and discharging part.

2. A main conveyor belt drive roller which drives said main conveyor belt claimed in claim 1, wherein both end sections of said drive roller are formed so that they are smaller in diameter than a central section of said drive roller, said central section being cylindrical shape, and projecting strips are formed at fixed intervals on the outer circumferential surfaces of said end sections, said projecting strips having outermost surfaces reaching approximately the same diameter as said central section and being gradually inclined rearward in the direction of rotation as they approach said central section, said intervals being at least over the width of said projecting strips.

3. A drive roller for driving said main conveyor belt according to claim 1, wherein said drive roller comprising a central section and two end sections which are smaller in diameter than said central section, said end sections being provided with projecting strips that have outermost surfaces being approximately the same in diameter as said central section and are inclined axially rearward relative to the direction of rotation of said drive roller.

4. An apparatus for gathering earthen cores released from a boring machine comprising;
- a main flat conveyor belt comprised of a horizontal receiving part at the bottom, an upward conveying part at the middle, and a horizontal discharging part at the top, and formed as a whole a reversed Z shape,
- an auxiliary flat conveyer belt installed in substantially an I shaped configuration so as to be in contact with said upward conveying part of said main conveyor,
- a guide chute provided on tines of a boring machine so as to collect earthen cores discharged from said tines and discharge said earthen cores through a discharge port onto said horizontal receiving part of said main flat conveyor belt,
- a transfer plate inclined upward toward the forward end and provided beneath said guide chute, a forward end of said transfer plate being located farther forward than a discharge port of said guide chute,
- a collecting box provided beneath said horizontal discharging part,
- wherein said earthen cores are discharged from said discharge port of said guide chute to said horizontal receiving part of said main flat conveyor belt, conveyed upwardly by being sandwiched between said upward conveying part and said auxiliary flat conveyor belt, and discharged from said horizontal discharge part of said main flat belt to said collecting box.

* * * * *